(12) United States Patent
Geyer et al.

(10) Patent No.: US 12,408,135 B2
(45) Date of Patent: Sep. 2, 2025

(54) SYSTEM FOR LOCALIZING OBJECTS IN AN INDOOR ENVIRONMENT USING A WIRELESS COMMUNICATION NETWORK

(71) Applicant: Airbus SAS, Blagnac (FR)

(72) Inventors: Fabien Geyer, Blagnac (FR); Thomas Multerer, Taufkirchen (DE); Dominic Schupke, Taufkirchen (DE)

(73) Assignee: Airbus SAS, Blagnac (FR)

( * ) Notice: Subject to any disclaimer, the term of this patent is extended or adjusted under 35 U.S.C. 154(b) by 408 days.

(21) Appl. No.: 17/984,308

(22) Filed: Nov. 10, 2022

(65) Prior Publication Data
US 2023/0171728 A1 Jun. 1, 2023

(30) Foreign Application Priority Data

Nov. 30, 2021 (EP) .................................... 21211501

(51) Int. Cl.
*H04W 64/00* (2009.01)
*G01S 13/00* (2006.01)

(52) U.S. Cl.
CPC ......... *H04W 64/003* (2013.01); *G01S 13/003* (2013.01)

(58) Field of Classification Search
CPC .... G01S 13/003; G01S 13/765; G01S 13/878; H04W 64/003
See application file for complete search history.

(56) References Cited

U.S. PATENT DOCUMENTS

| | | | |
|---|---|---|---|
| 11,212,650 B2 | 12/2021 | Ghourchian et al. | |
| 2017/0086202 A1 | 3/2017 | Chen | |
| 2022/0198162 A1* | 6/2022 | Eizenberg | G01S 5/0284 |
| 2022/0329330 A1* | 10/2022 | Merlin | H04W 16/20 |
| 2022/0329980 A1 | 10/2022 | Mendes et al. | |
| 2024/0338713 A1* | 10/2024 | Tang | H04W 4/029 |

FOREIGN PATENT DOCUMENTS

| | | |
|---|---|---|
| DE | 102019220630 A1 | 7/2021 |
| KR | 20100073744 A | 7/2010 |
| WO | 2018094502 A1 | 5/2018 |

OTHER PUBLICATIONS

European Search Report dated Jun. 3, 2022; priority document.
Y. Ma, et al., "WiFi Sensing with Channel State Information: A Survey" College of William and Mary, Association (USA) for Computing Machinery, Survey, vol. 52, No. 3, Article 46, Jun. 2019; 36 pages.

* cited by examiner

*Primary Examiner* — Timothy X Pham
(74) *Attorney, Agent, or Firm* — Greer, Burns & Crain, Ltd.

(57) ABSTRACT

A system for localizing an object in an indoor environment. The system uses a plurality of wireless access points and at least one cooperative mobile network device. The cooperative mobile network device is connected to at least one of the wireless access points. The wireless access points and the cooperative mobile network device sense first and second signal propagation data of wireless signals transmitted via the wireless communication network. The cooperative mobile network device evaluates the second signal propagation data and determines its own position based on the data and the positions of the wireless access points. A position of an object is obtained based on the evaluated first and second signal propagation data, the positions of the wireless access points and the determined position of the cooperative mobile network device.

14 Claims, 2 Drawing Sheets

SYSTEM FOR LOCALIZING OBJECTS IN AN INDOOR ENVIRONMENT USING A WIRELESS COMMUNICATION NETWORK

CROSS-REFERENCES TO RELATED APPLICATIONS

This application claims the benefit of the European patent application No. 21211501.8 filed on Nov. 30, 2021, the entire disclosures of which are incorporated herein by way of reference.

FIELD OF THE INVENTION

The present invention relates to a system for object localization, particularly in the passenger cabin of a vehicle, especially an aircraft.

BACKGROUND OF THE INVENTION

In civil air traffic, huge numbers of passengers are regularly transported. After every flight, the cabin crew has to ensure the cabin of the aircraft is empty. In order to recognize, for example, people or forgotten luggage or other objects, the cabin crew has to manually check the passenger cabin, e.g., the overhead compartments. In order to improve and speed up the workflow of the cabin crew, automatic recognition of such persons or objects by sensing technologies may be advantageous.

The vast majority of indoor localization methods currently on the market require the installation of additional equipment in the area where the localization is being performed. This can be considered a disadvantage in object localization inside a vehicle cabin, as additional equipment usually means additional weight as well as the need for additional certification.

WO 2018/094502 A1 describes a device-free localization method in smart indoor spaces, such as an apartment or other living area, covered by wireless networks with active commercially available devices. The method uses existing wireless communication signals and machine learning techniques to automatically detect entry into the area and track the position of a moving individual within the coverage area.

The paper Ma et al, "WiFi Sensing with Channel State Information: A Survey," ACM Computer Survey, 2019, provides an overview of signal processing techniques, algorithms, applications, and performance results of WiFi sensing with channel state information (CSI). CSI represents how wireless signals propagate from a transmitter to a receiver at specific carrier frequencies along one or multiple paths. For example, CSI can be represented as a matrix of complex values representing the amplitude attenuation and phase shift of (multipath) WiFi channels. A time series of CSI measurements captures, how wireless signals interact with surrounding objects and people in time, frequency, and space domains, and can therefore be used for various wireless measurement applications.

DE 10 2019 220 630 A1 discloses a system for object localization in an indoor environment. The system comprises a wireless communication infrastructure configured to enable wireless communication within the indoor environment via a wireless communication network. The system further comprises at least one wireless access point, wherein the wireless access point is further configured to acquire signal propagation data of wireless signals transmitted over the wireless communication network along a plurality of propagation paths. The system further includes a processing device configured to analyze the signal propagation data and extract localization data from the signal propagation data, wherein the localization data specifies the location of objects located within the indoor environment.

SUMMARY OF THE INVENTION

It is an objective of the invention to provide more accurate solutions for indoor localization of active and passive objects that are compatible with the specific requirements of vehicle cabins.

Although it can be used in many applications, the present invention and its underlying problems will be explained in more detail with respect to passenger aircraft. However, the methods and devices described herein may also be used in other vehicles and in any transportation environment, such as for road vehicles, for rail vehicles, for general aircraft, or for watercraft or in buildings. In addition, the systems and methods disclosed herein may be used for other environments, such as automated or semi-automated assembly lines for tracking component flow.

According to a first aspect, a system for localizing an object in an indoor environment is provided. The system comprises a wireless communication infrastructure which is configured to enable wireless communication inside the indoor environment via a wireless communication network. The wireless communication infrastructure comprises a plurality of wireless access points, at least one cooperative mobile network device and a processing device. The plurality of wireless access points is configured to provide mobile network devices with access to the wireless communication network. The (at least one) cooperative mobile network device is in communication with (at least one of) the plurality of wireless access points. Each of the wireless access points is configured to sense first signal propagation data of wireless signals transmitted via the wireless communication network. The cooperative mobile network device is configured to sense second signal propagation data of wireless signals transmitted via the wireless communication network. Further, the cooperative mobile network device is configured to evaluate the second signal propagation data and to determine its own position based on the evaluated second signal propagation data and positions of the wireless access points. The positions of the wireless access points may be known in advance or may be included in a configuration file that is accessible to the cooperative mobile network device. The processing device is configured to evaluate the first signal propagation data and to extract localization data indicative of the position of an object located in the indoor environment based on the evaluated first signal propagation data, on the evaluated second signal propagation data, on the determined position of the cooperative mobile network device and on the positions of the wireless access points.

One idea of the present invention is to use a wireless communication architecture already present inside an indoor environment, such as in a passenger cabin of an aircraft and other typical vehicle cabins, to locate moving and/or stationary as well as active or passive objects in the indoor environment of the respective cabin. However, the system can, in principle, be used in any indoor environment and is not limited to vehicle cabins. To this end, the present invention utilizes the hardware of the communication devices of the wireless access points provided in the vehicle for wireless Internet access of user devices, e.g., personal electronic devices such as smartphones, tablet computers, and so on. In the present description, such user devices are called non-cooperative mobile network devices since they do not actively participate in the localization process. The aforementioned wireless access points are, in principle, capable of capturing all information present in the wireless signals transmitted over the cabin wireless communication network and relevant for tracking and/or locating objects within the cabin. In many applications, it is sufficient to simply adjust and/or update the software of the respective wireless access point communication devices to enable the wireless access points to sense and evaluate the first signal propagation data to locate objects. CSI obtained from radio frequency signals (e.g., amplitude and phase of OFDM subcarriers) used to exchange information between the various access points and mobile network devices can then be used to sense and fingerprint the environment and detect changes of the environment and, in general, of the surrounding of the access points and of the cooperative mobile network device. Changes can also be detected by analyzing the temporal changes in CSI due to the movement of objects (e.g., Doppler shift), including vibration and rotation. These changes can then be used to predict the position of an object. When referring to wireless signals transmitted via the wireless communication network, it is to be understood that this relates to wireless signals transmitted between the cooperative mobile network device and one or more access points and/or to signals transmitted between two or more access points.

It is one particular aspect of the approach described herein that it additionally utilizes cooperative mobile network devices which are in communication with the wireless access points.

As described above, non-cooperative mobile network devices are regular user devices that can, in principle, connect to wireless access points. Although these non-cooperative mobile network devices do exchange data with the wireless access points, they do not analyze signal propagation data, and therefore do not actively participate in localizing an object. In particular, non-cooperative mobile network devices can typically only exchange data with one wireless access point at a time and do not allow access to properties of signals received by the non-cooperative mobile network device, such as channel state information.

Cooperative mobile network devices, on the other hand, do actively participate in the implemented localization scheme. In particular, the cooperative mobile network devices can sense signal propagation data (the second signal propagation data), e.g., channel state information, of signals exchanged between the wireless access points and the respective cooperative mobile network device and perform calculations on these signals. Also, the cooperative mobile network devices make the evaluated second signal propagation data accessible by the wireless access points. Therefore, the cooperative mobile network devices being cooperative means these devices cooperate in the above-described sense with the wireless access points while localizing objects within the indoor environment. In particular, and in contrast to the non-cooperative mobile network devices, the cooperative mobile network devices are capable of connecting to more than one wireless access point at a time. Therefore, the second signal propagation data, sensed and analyzed by the cooperative mobile network devices, can be communicated to the wireless access points to which the cooperative mobile network device is connected. Such cooperative mobile network devices may, for example, be standard Wi-Fi enabled devices which received a software or firmware update in order to implement the described functionalities.

The general principle of the position determination relies upon the detection of changes of wireless signals sent within the indoor environment in which an object is present compared to wireless signals sent without the object to be localized being present in the indoor environment. For example, when a passive object is present within the indoor environment, signals sent by the wireless access points are impinging upon the objects and are partially absorbed and partially reflected and/or scattered. Also, depending on the material of the object, the reflected signal can experience a phase change. Further, the signals can travel along multiple paths. These changes of the signals can then be recognized, e.g., in the channel state information, when the reflected and/or scattered signals are received by other devices in the wireless communication infrastructure, such as other wireless access points or cooperative mobile network devices.

In general, the usage of cooperative mobile network devices together with the wireless access points enhances accuracy of the position determination of objects because fingerprinting of the indoor environment is improved by the cooperative mobile network device. This is due to the fact that the cooperative mobile network device provides an additional measurement device which is not fixed in position, such as the wireless access points. The cooperative mobile network device may be a personal device that is carried by a human operator and changes its position in accordance with the operator's movement. It is therefore possible to better map the environment because more signal paths are included in the calculations and parameter space is increased. Further, using cooperative mobile network devices allows to analyze signals within the indoor environment where not necessarily all of the wireless access points can communicate with each other because of the distance therebetween. Cooperative mobile network devices could, e.g., be devices which are carried by members of the cabin crew of an aircraft.

In the described system, the wireless access points sense and evaluate first signal propagation data. These signal propagation data may, for example, be channel state information of the signals sent and received by the wireless access points. The at least one cooperative mobile network device additionally senses and evaluates second signal propagation data of signals sent and received by the cooperative mobile network device. Using these second signal propagation data and the known positions of the wireless access points, the cooperative mobile network device can localize itself with respect to the wireless access points. As will be readily apparent to one of ordinary skills in the art, all the necessary initial state information of the wireless signals is inherently included in the respective signals. The determined position of the cooperative mobile network device and the evaluated second signal propagation data can then be sent to the wireless access points and/or the processing device.

The processing device may be installed anywhere within an indoor environment, e.g., in the vehicle cabin, and may be in wireless or wired data communication with the wireless access points and/or the cooperative mobile network device. The system can thus provide an approach to distributed data analysis. However, the processing device may also be provided at the respective wireless access point and/or the cooperative mobile network device such that every such device is enabled to perform its own evaluation calculations of the respective signal propagation data. In other words, the processing device may be structurally assigned to one access point while it carries out functions that are based on the data received from multiple access points. Furthermore, the processing device may even be deployed outside the indoor environment. The processing device performs the final calculations and extracts localization data of an object to be localized from the first signal propagation data, the second signal propagation data, the known positions of the wireless access points and the determined position of the cooperative mobile network device at the given instance in time.

Thus, it is possible to locate passive objects, such as forgotten luggage of passengers or safety equipment such as life jackets or the like, without the need for additional equipment in the passenger cabin (like an additional localization system) and/or on the respective object to be localized. It is also possible to locate active objects, such as the described non-cooperative mobile network devices, by passively capturing data exchanged between the non-cooperative mobile network device and the respective wireless access point. Both modes of operation are described with more detail further below with regard to certain embodiments. During aircraft operations, the approach described herein will reduce cabin crew workload and speed up turnaround times.

The system can generally be used to localize people, objects, and small changes in location (e.g., vibrations) within a vehicle cabin, such as an aircraft cabin. Such localization functions may be used to facilitate the deployment of aircraft equipment (e.g., sensors) on the final assembly line, during aircraft operations to support crew activities (e.g., checking aircraft status after landing), or for preventive maintenance.

According to an embodiment, the at least one cooperative mobile network device is configured to simultaneously establish and/or utilize connections to at least two wireless access points.

In this configuration, the cooperative mobile network device can use data from different wireless access points simultaneously and can therefore better determine its own position.

According to a further embodiment, the first signal propagation data and/or the second signal propagation data comprises correlation data of the wireless access points and/or of the cooperative mobile network device.

The system works with a plurality of wireless access points and with at least one cooperative mobile network device. In the presence of multiple access points, the proposed system is able to utilize the spatial property of fingerprints from multiple adjacent wireless access points as well as from cooperative mobile network devices located within the indoor environment, such as a vehicle cabin. Such spatial relationships between adjacent fingerprints makes them stable to signal variations. Furthermore, challenging scenarios, such as environments without line-of-sight, can be handled. Based on the collected data from the different wireless access points and from the cooperative mobile network devices, a preprocessing and normalization process can be applied to extract relevant features.

To increase the accuracy of the system, correlation of the data generated by the different wireless access points and the cooperative mobile network devices available in the indoor environment can be performed. The collected data can be correlated according to the time of their measurement to obtain a common measurement of the environment at a given time. This use of multiple wireless access points together with the cooperative mobile network devices allows a larger portion of the indoor environment to be covered from different measurement points, which means that the area where indoor positioning occurs has better coverage. This is particularly useful in an indoor environment with other objects, as these other objects can partially block the propagation of RF signals. The usage of multiple wireless access points and at least one cooperative network device can also increase the accuracy of the system in line-of-sight and non-line-of-sight situations.

According to a further embodiment, the first signal propagation data sensed by the wireless access points and/or the second signal propagation data sensed by the at least one cooperative mobile network device comprises channel state information, CSI.

In wireless communications, CSI characterizes how wireless signals propagate from a transmitter to a receiver at specific carrier frequencies. This information represents the combined effect of, for example, scattering, attenuation, and power degradation with distance. CSI amplitude and phase are affected by multipath effects including amplitude attenuation and phase shift. Specifically, the CSI are affected by the displacements and movements of the transmitter, receiver, and surrounding objects. In other words, the CSI capture the wireless properties of the environment. These properties, supported by mathematical modeling or machine learning algorithms, can be used for various sensing applications.

According to a further embodiment, the first signal propagation data sensed by the wireless access points and/or the second signal propagation data sensed by the cooperative mobile network device comprises at least one of a spatial, a frequency related, an amplitude related or a time related variation of wireless signals within the indoor environment.

For example, CSI amplitude variations in the time domain have different patterns for different motions that can be used for motion detection, including vibration and rotation.

CSI phase shifts in the spatial and frequency domains, i.e., transmit/receive antennas and carrier frequencies, are related to the delay and direction of signal transmission, which can be used for object localization and tracking. Further, phase shifts can occur according to the specific material of the localized object. So, in principle, the type of object can also be determined.

According to a further embodiment, the wireless access points and/or the cooperative mobile network device are Wi-Fi enabled devices according to one of the Wi-Fi standards IEEE 802.11.

For example, the communication architecture can be based on standard technologies such as IEEE 802.11n or IEEE 802.11ac or the like. However, any other suitable communication standard or protocol can be used.

According to a further embodiment, the processing device is configured to execute a machine learning algorithm on the first signal propagation data and the second signal propagation data and the machine learning algorithm is configured to extract the localization data based on training data. The training data has been obtained by an object position measurement system and/or predetermined test object arrangement within the indoor environment.

The machine learning algorithm may be executed on any suitable device of the wireless communication infrastructure. In particular, the algorithm may be implemented by the processing device. However, it is also conceivable that the algorithm is running directly within the wireless access points or the cooperative mobile network device. The data collected by the wireless access points and the cooperative mobile network device can be fed to the machine learning algorithm which makes a prediction about the position of objects in the indoor environment. To train the algorithm, a training phase must first be performed in which the position of objects is measured. To find this position, an external positioning system can be used, for example. This external positioning system can be based on a standard computer vision approach. Using one or more cameras and markers, specific objects can be marked and their positions easily extracted. Another possible external positioning system can be based on the use of accelerometers or gyroscopes, which are used to calculate the displacement of an object by transforming the information from an external sensor. Given the original coordinates of an object (e.g., aircraft entrance door), the final position can be estimated based on the directional displacement. In other words, the training phase includes the steps of identifying, by a machine learning approach, the impact of an object at a certain position to the signals received by the access points and/or the cooperative mobile network device compared to the signals received by the access points and/or the cooperative mobile network device in absence of the object.

The calculated positions, based on external positioning systems such as computer vision or accelerometers, can then be used to train the machine learning algorithm Multiple measurements can then be taken in a specific target environment, moving objects throughout the environment, while recording raw data from the wireless network architecture. Standard optimization techniques (such as, e.g., gradient descent) can then be used to train the machine learning algorithm Once training is complete, an evaluation phase can be performed. The position of objects can then be predicted directly using only the information from the wireless network architecture.

According to a further embodiment, the machine learning algorithm is configured to extract the positions of static objects within the indoor environment.

However, it should be noted that the machine learning algorithm may also extract the positions of moving/mobile objects.

For example, the machine learning algorithm may be trained on a predetermined test object arrangement in the indoor environment, such as a passenger cabin. As soon as an object is moved from this test object arrangement to another position within the cabin or completely removed from the cabin during the operation of the system, the signal propagation data changes compared to the initial state of the indoor environment. The changed signal propagation data is assigned to the changed configuration of the indoor environment. These changes are even reflected in the signal propagation data when the object is static after the movement. Furthermore, additional (static) objects inside the cabin that were not considered during the training phase may affect the signal propagation data during the operation of the system.

According to a further embodiment, the extraction of localization data comprises the evaluation of time series and a spectral analysis in order to detect moving objects.

In particular, evaluation techniques similar to those used in RADAR technology can be used. Each measurement consists of a CSI vector for each transmitter-receiver pair (e.g., wireless access point to cooperative mobile network device or cooperative mobile network device to cooperative mobile network device or wireless access point to wireless access point). Different antennas on the wireless access points generate a separate CSI vector. Some means of background subtraction can be applied on the signals in order to filter background noise and to increase sensitivity of the sensing system. After that, the CSI vectors can, e.g., be analyzed regarding their frequency content. This can happen, for example, by means of spectral analysis like Fast Fourier Transformation (FFT) or MUSIC etc. From the spectrum, targets can be detected, and their ranges can be extracted. When evaluating time series, also Doppler/Velocity can be extracted Azimuth and elevation can be provided for multiple-input multiple output (MIMO) devices. The target vector (number of targets, range, velocity, azimuth, elevation) of each individual device can be sent to a combining station which generates the "picture" of the environment. The combining station uses, for example, multilateration to localize objects. The combining station may, for example, be the processing device.

According to a further embodiment, the first signal propagation data sensed by the wireless access points and/or the second signal propagation data sensed by the cooperative mobile network device is obtained from wireless signals reflected from a passive object, the passive object is not sending any wireless signals and the localization data is indicative of the position of the passive object.

A passive object within the meaning of the present description is any object that does not send or receive any wireless signal. This could be, for example, a piece of luggage, but also devices which are in principle capable of wireless communication but that do not emit and/or receive data (i.e., are passive) at the instance in time, the position determination is performed, such as a notebook computer that is shut down.

Wireless signals sent out by either the wireless access points or a cooperative mobile network device are partially reflected and partially absorbed when they impinge on such a passive object. The reflected signal thereby, e.g., changes in phase, frequency or amplitude, meaning (for example) the channel state information of the signal changes. When the reflected signal is received by another wireless access point or cooperative mobile network device, such device can sense (as described above) first or second signal propagation data. This data can then be evaluated and used (together with the known positions of the wireless access points and the determined position of the cooperative mobile network device, as described above) to extract localization data which is indicative of the position of the passive object.

According to a further embodiment, the first signal propagation data sensed by the wireless access points and/or the second signal propagation data sensed by the cooperative mobile network device is obtained by the wireless access points and/or the cooperative mobile network device passively capturing wireless signals exchanged between a non-cooperative mobile network device and the wireless access point to which the non-cooperative mobile network device is connected. The localization data is indicative of the position of the non-cooperative wireless network device.

As described above, non-cooperative mobile network devices are devices with wireless capabilities, such as Wi-Fi enabled user devices (e.g., smartphones, notebooks, etc.) that are not part of the localization system, i.e., which are not cooperating with the wireless access points to localize objects. These devices do not provide additional data, such as channel state information analysis, and therefore do not actively participate in the localization procedure. However, they are connected to one of the wireless access points and therefore do exchange some data with them.

The transmitted data between the non-cooperative mobile network devices can be passively captured by the cooperative network devices. Therefore, the cooperative mobile network devices can sense and compute some signal propagation data for the signals received and sent by the non-cooperative mobile network devices. This data, together with the known positions of the wireless access points and the determined position of the respective cooperative mobile network device (which determination takes place beforehand, as explained above) can be used to determine localization data indicative of the position of the non-cooperative mobile network device.

According to a further embodiment, the first signal propagation data and/or the second signal propagation data is provided as raw data from the physical layer of the wireless communication infrastructure.

For example, raw data from the physical layer (in the form of IQ samples, i.e., In-phase and Quadrature-phase of Orthogonal Frequency-Division Multiplexing, OFDM, communication protocols) of the communication layer such as channel state information (CSI) can be used. In addition, the temporal changes of the IQ samples can be used. If multiple wireless access points and/or multiple cooperative mobile network devices are used, the collected data can be correlated according to when they were measured to obtain a common measurement of the environment at a given time.

According to a further embodiment, the indoor environment is a passenger cabin of an aircraft.

According to a further aspect, an aircraft is provided. The aircraft comprises a passenger cabin and a system for localizing an object in an indoor environment as described above.

The object localization system can be designed according to any one of the embodiments described above. In particular, the passenger cabin of the aircraft is the indoor environment in which the object localization is performed by the system. The wireless access points can, for example, be standard wireless access points which are present in the cabin of the passenger aircraft in order to allow passengers to connect to the internet using the Wi-Fi network of the aircraft. In this case, the system for object localization can, e.g., be used to detect forgotten luggage. The at least one cooperative network device can, for example, be a crew device which is carried by members of the cabin crew.

In summary, the description provides a system for localizing passive and active objects within an indoor environment, which does not require additional equipment to be present on objects to be localized or in the indoor space. Because the system uses additional cooperative network devices in conjunction with wireless access points, more signal paths can be analyzed, and the indoor environment can be better mapped. Thereby, the cooperative network devices provide additional data that can be used to compute positions of passive and active objects. Although non-cooperative mobile network devices do not actively participate in their position determination, the signals sent by these devices still facilitate position determination of the non-cooperative network devices. Therefore, accuracy of the system is increased with regard to known systems in the prior art. Machine learning algorithms allow for easy and quick adaptation to different indoor environments.

BRIEF DESCRIPTION OF THE DRAWINGS

In the following, exemplary embodiments are described in more detail having regard to the attached figures. The illustrations are schematic and not to scale. Identical reference signs refer to identical or similar elements.

DETAILED DESCRIPTION OF THE PREFERRED EMBODIMENTS

Figure 1:
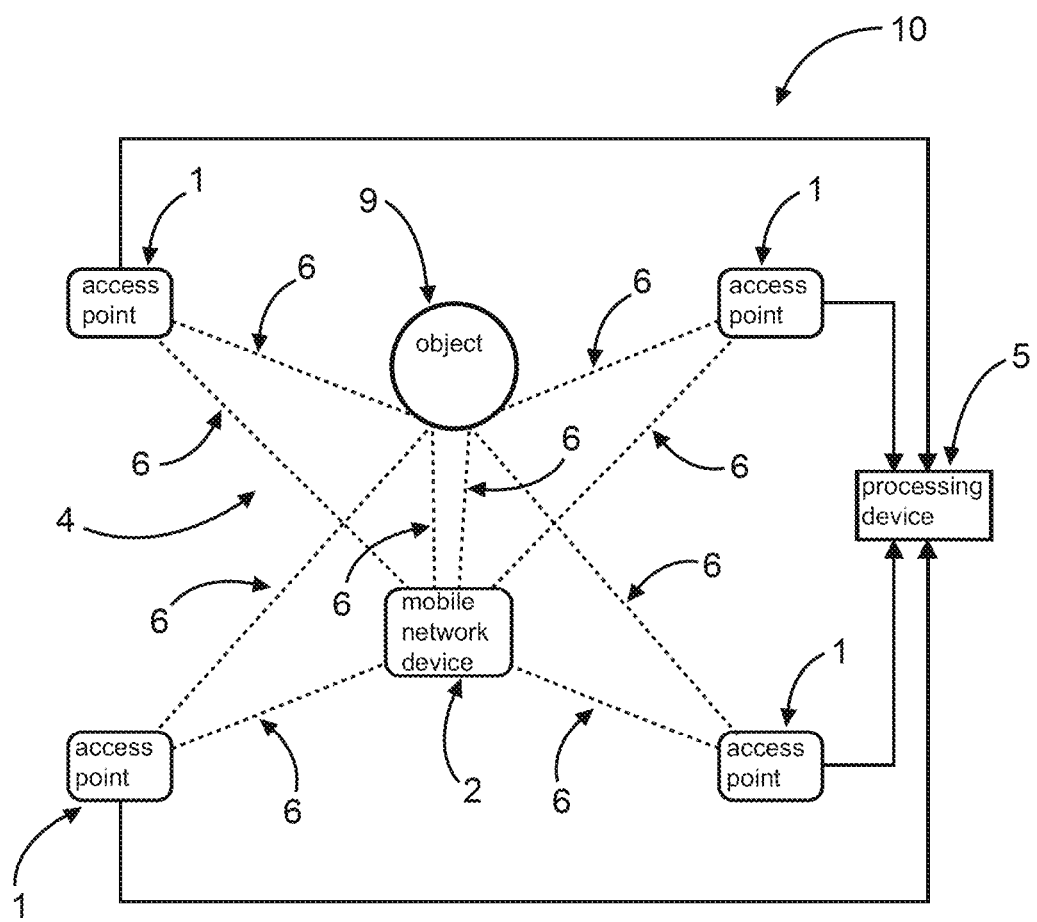
FIG. 1 shows a schematic view of a system for localizing an object in an operation mode for localizing a passive object.

FIG. 1 shows a system 10 for localizing an object 9 in an indoor environment 20 (not shown in FIG. 1) according to an exemplary embodiment. The indoor environment 20 may be any indoor environment 20, such as the indoor environment 20 of FIG. 3 in a passenger cabin of an aircraft or other vehicle or an indoor environment 20 in a building. The system 10 comprises a wireless communication infrastructure including four wireless access points 1, one cooperative mobile network device 2 and a processing device 5. The wireless communication infrastructure is configured to enable wireless communication via a wireless communication network 4 and, in particular, is configured to provide mobile network devices with access to the wireless communication network 4. Although shown with only one cooperative mobile network device 2, it is also possible to use more than one cooperative mobile network device 2, which further increases accuracy of the position determination of objects 9. For example, it is conceivable that every member of the cabin crew carries a cooperative mobile network device 2. Also, any suitable number of wireless access points 1 can be used.

In FIG. 1 (and FIG. 2), the processing device 5 is connected to each of the wireless access points 1, wherein the wireless access points can either be connected to the processing device 5 by a wired connection or by a wireless connection. A wired connection may, for example, be a regular wired connection using, e.g., copper wires or a busbar in an aircraft, or also a fiber optics connection or any other suitable connection allowing to transfer data. However, while shown as separate device in FIG. 1 (and FIG. 2), the processing device 5 can also be included in one or all of the wireless access points 1 and/or in the cooperative mobile network devices 2.

Each of the wireless access points may be a Wi-Fi access point according to any one of the IEEE 802.11 standards, such as IEEE 802.11n or IEEE 802.11ac or similar Such wireless communication infrastructure corresponds to wireless communication systems as widely used in vehicle cabins, especially aircraft cabins, to provide wireless computing and/or communication access, e.g., to the Internet, to the crew and/or passengers, and for wireless sensor networks and machine-to-machine communication.

However, unlike these known systems, the wireless access points 1 are further configured to collect first signal propagation data of wireless signals 6 transmitted over the wireless communication network 4 on multiple propagation paths. In particular, the signal propagation data may include channel state information (CSI) and similar quantitative information about the spatial, frequency, and temporal variations of the wireless signals 6 within the indoor environment 20. Also, the cooperative mobile network device 2 is configured to sense second signal propagation data, which can also be channel state information (CSI) or similar quantitative information about the spatial, frequency, and temporal variations of the wireless signals 6 within the indoor environment 20. In general, wireless signals 6 can change its properties such as amplitude, frequency or phase when they travel through a medium. In particular, wireless signals 6 which are, e.g., reflected by objects 9 within the indoor environment have different properties than signals that are travelling within the indoor environment 20 without any disturbances by objects 9.

FIG. 1 shows the system 10 in an operation mode for detecting passive objects 9, meaning objects 9 that do not send out or receive any wireless signals 6 and are not connected with the wireless access points. However, such objects 9 may also be objects 9 which are in general capable for wireless communication but are turned off at the moment of the position determination. The first and second signal propagation data can be used to monitor the indoor environment 20 swept by the wireless signals 6 and to determine if the positions of the objects 9 within the passenger cabin 101 are changing.

For example, amplitude and phase of radio frequency signals exchanged between wireless access points 1 can be analyzed to obtain a fingerprint of the indoor environment 20 and detect changes within that environment, which can then be used to predict the position of an object 9 within the indoor environment 20. Temporal changes in radio signals due to the movement of objects 9 can also be analyzed (e.g., by Doppler shift) to track moving objects 9 within the indoor environment 20. The primary goal is to passively locate objects 9 within the indoor environment 20 using a fingerprinting technique based on machine learning, aggregation of data from multiple measurement points, and distributed or central processing. For this purpose, the second signal propagation data sensed by the cooperative mobile network device 2 is evaluated by the cooperative mobile network device 2, which can, according to the above concept, determine its own position based on the evaluated second signal propagation data and the known positions of the wireless access points 1. Thereby, the cooperative mobile network device can be in simultaneous communication with some or all of the wireless access points 1 and use the data to determine its own position.

The wireless access points 1 evaluate the first signal propagation data as raw data at the physical layer of the wireless communication infrastructure (e.g., in the form of IQ samples). The collected signal propagation data are correlated according to their measurement time. Based on the collected data from the different wireless access points 1, a preprocessing and normalization process is applied to extract relevant features. Formatting of the data for processing using machine learning techniques is also performed. Each wireless access point 1 can carry out this preprocessing step (see further below) or the processing device 5 can preprocess the data. Similarly, the second signal propagation data sensed by the cooperative mobile network device 2 is preprocessed.

The wireless access points 1 sense first signal propagation data of wireless signals 6 reflected form the passive object 9, in particular having regard to the channel state information. The cooperative mobile network device 2 senses and evaluates the second signal propagation data. The first and second signal propagation data as well as the fixed positions of the wireless access points 1 and the determined actual position of the cooperative mobile network device 2 are provided to the processing device 5.

Figure 2:
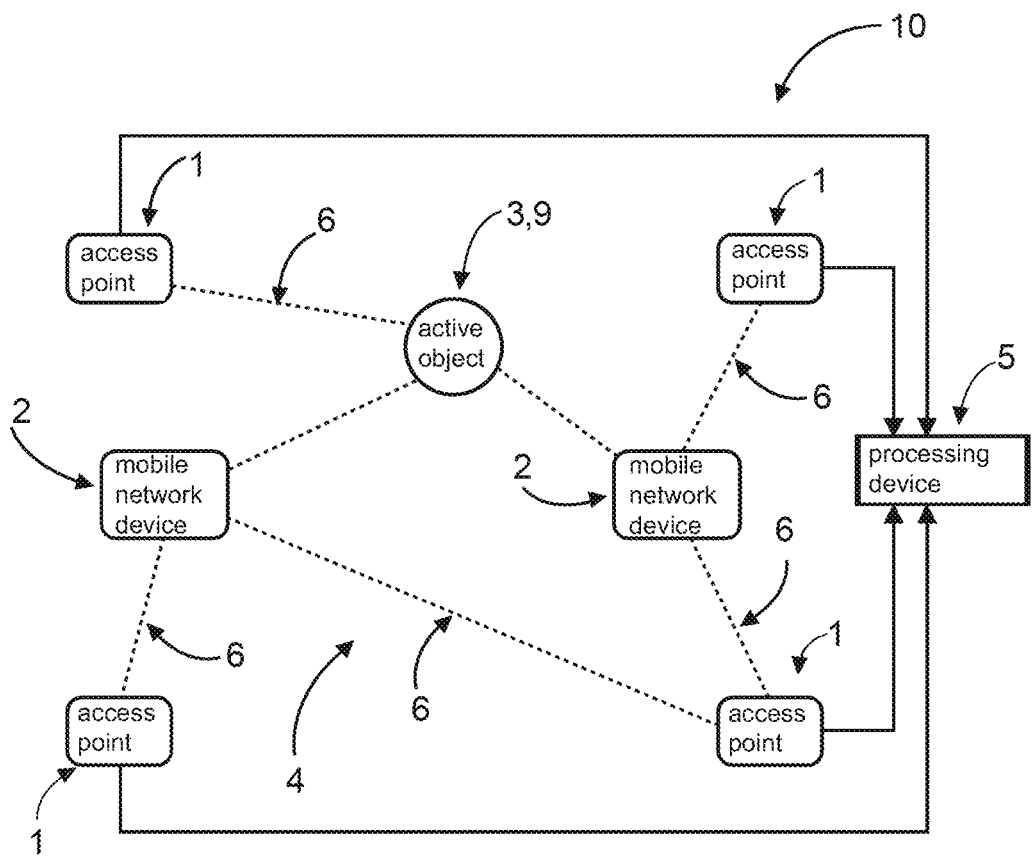
FIG. 2 shows a schematic view of a system for localizing an object in an operation mode for localizing an active, non-cooperative mobile network device.

In FIGS. 1 and 2, the processing device 5 is a separate central device to which all the wireless access points 1 and the cooperative mobile network device 2 are connected. However, the processing device may also be part of the wireless access points 1 or the cooperative mobile network device 2. The processing device 5 receives the pre-processed first and second signal propagation data from the wireless access points 1 and the cooperative mobile network device 2 and analyzes the first and second signal propagation data to extract localization data from the first and second signal propagation data. The known fixed positions of the wireless access points 1 and the determined position of the cooperative mobile network device 2 are also taken into account for this analyzation. The processing device 5 may be a processor or the like that is integrated into a computing framework of the aircraft 100 and may, for example, be coupled to a cabin management system of the aircraft 100. The localization data indicates the position and possibly the movement of objects 9 located within the indoor environment 20.

The processing device 5 is arranged to execute a machine learning algorithm on the signal propagation data to extract the position data based on the training data. For example, the training data may be generated using an object position measurement system within the indoor environment 20 to detect and track marked objects 9 during a training phase. At the same time, the system 10 may continuously monitor the signal propagation data within the indoor environment 20. The recorded position information of these tracked objects 9 may be used in conjunction with the collected signal propagation data to train the machine learning algorithm during this test phase.

As will be readily apparent to one of ordinary skill in the art, other alternative or additional training variants are also possible. Another possible external positioning system may be based on the use of accelerometers or gyroscopes. In another example, a predetermined test array of test objects 9 may be used to calibrate the signal propagation data in a training phase. The machine learning algorithm may then be executed on signal propagation data recorded during operation of the system 10.

Based on such a training phase, the machine learning algorithm is then able to extract the positions of not only moving objects 9 but also static objects 9 within the indoor environment 20. For example, the training phase may have been performed on an empty cabin. The machine learning algorithm will now detect any changes to this empty state of the indoor environment. In this way, any new objects 9 within the indoor environment can be detected based on the respective changes in the first and second signal propagation data compared to the training scenario. Similarly, the system 10 will be able to distinguish any change in position of objects 9 that were in the indoor environment during the training phase.

As a result, objects 9 such as forgotten passenger luggage or safety equipment such as life jackets can be detected and potentially tracked without the need to introduce expensive and heavy additional equipment in the indoor environment. An already existing wireless communication infrastructure only needs to be upgraded, e.g., by a simple software update, to be able to record and analyze the first and second signal propagation data generated inside the cabin. The cooperative mobile network devices 2 may, for example, be regular smartphones which have been provided with a software enabling the necessary functionalities. By using cooperative network devices 2 in addition to the wireless access points 1 to determine the position of objects 9, accuracy of the determination is enhanced because better sampling of the indoor environment is (because the cooperative mobile network device 2 is not at a fixed position) achieved and more signal paths can be analyzed.

FIG. 2 shows the system 10 of FIG. 1 in an operation mode for localizing an active object 9, which is a non-cooperative mobile network device 3. In FIG. 2, the system 10 comprises a second cooperative mobile network device 2.

In this operation mode, the system 10 works basically in the same way as described with reference to FIG. 1.

When a non-cooperative mobile network device 3 is connected to one or more of the wireless access points 1, this non-cooperative mobile network device exchanges some date with the wireless access points 1 but does not actively participate in the localization procedure. In particular, the non-cooperative mobile network device does not provide any channel state information or other signal propagation data to the system 10. Such a non-cooperative mobile network device 3 may, e.g., be a wireless device of a passenger of an aircraft, such as a smartphone or notebook, which is connected to the wireless communication infrastructure.

Though the non-cooperative mobile network device 3 does not actively participate in the determination of its position, the wireless signals 6 exchanged between the non-cooperative mobile network device 3 and the corresponding wireless access point 1 can be passively captured by the cooperative mobile network devices 2, as indicated by the dashed signal capture lines 7. These captured signals can then be evaluated by the cooperative mobile network devices 2 and/or the wireless access points 1 and/or the processing device 5 to estimate the position of the non-cooperative mobile network device 3 in the same way as described with regard to a passive object in FIG. 1.

Figure 3:
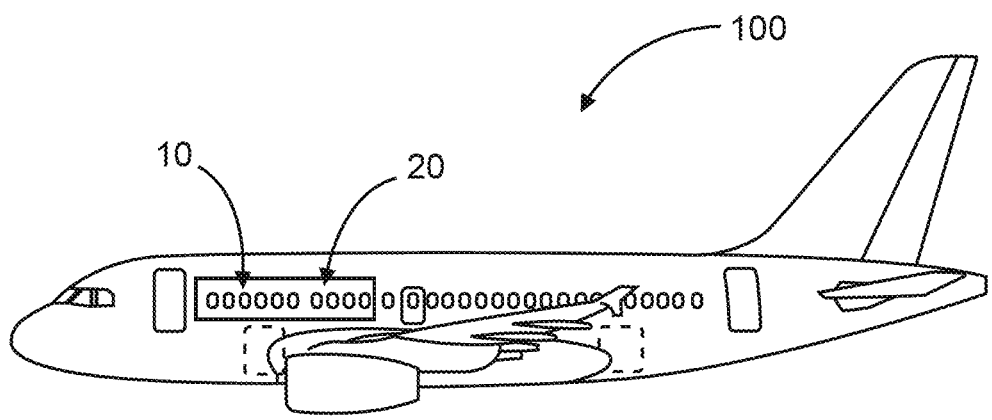
FIG. 3 shows an aircraft having the system for localizing an object of FIGS. 1 and 2.

FIG. 3 shows an aircraft 100 having a system 10 for localizing an object 9 (FIGS. 1 and 2) in an indoor environment 20. The indoor environment 20 corresponds to the passenger cabin of the aircraft 100. Although shown as only covering part of the cabin, the indoor environment 20 can also be the full cabin of the aircraft 100.

It should be noted that "comprising" or "including" does not exclude other elements or steps, and "one" or "a" does not exclude a plurality. It should further be noted that features or steps that have been described with reference to any of the above embodiments may also be used in combination with other features or steps of other embodiments described above. Reference signs in the claims are not to be regarded as limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Wireless access points
2 Cooperative mobile network devices
3 Non-cooperative mobile network devices
4 Wireless communication network
5 Processing device
6 Wireless signals
7 signal capture lines
9 Object
10 System for object localization
20 Indoor environment, passenger cabin
100 aircraft

The invention claimed is:

1. A system for localizing an object in an indoor environment, the system comprising:
a wireless communication infrastructure, configured to enable wireless communication inside the indoor environment via a wireless communication network, the wireless communication infrastructure comprising:
a plurality of wireless access points, configured to provide mobile network devices with access to the wireless communication network;
at least one cooperative mobile network device in communication with at least one of the plurality of wireless access points; and
a processing device;
wherein each of the wireless access points is configured to sense first signal propagation data of wireless signals transmitted via the wireless communication network;
wherein the cooperative mobile network device is configured to sense second signal propagation data of wireless signals transmitted via the wireless communication network;
wherein the cooperative mobile network device is configured to evaluate the second signal propagation data and to determine its own position based on the evaluated second signal propagation data and positions of the wireless access points; and
wherein the processing device is configured to evaluate the first signal propagation data and to extract localization data indicative of the position of an object located in the indoor environment based on the evaluated first signal propagation data, on the evaluated second signal propagation data, on the determined position of the cooperative mobile network device, and on the positions of the wireless access points.

2. The system of claim 1, wherein the at least one cooperative mobile network device is configured to simultaneously at least one of establish or utilize connections to at least two wireless access points.

3. The system of claim 1, wherein at least one of the first signal propagation data or the second signal propagation data comprises correlation data of at least one of the wireless access points or the cooperative mobile network device.

4. The system of claim 1, wherein at least one of the first signal propagation data sensed by the wireless access points or the second signal propagation data sensed by the at least one cooperative mobile network device comprises channel state information, CSI.

5. The system of claim 1, wherein at least one of the first signal propagation data sensed by the wireless access points or the second signal propagation data sensed by the cooperative mobile network device comprises at least one of a spatial, a frequency related, an amplitude related or a time related variation of wireless signals within the indoor environment.

6. The system of claim 1, wherein at least one of the wireless access points or the cooperative mobile network device are Wifi enabled devices according to a Wifi standard in IEEE 802.11.

7. The system of claim 1,
wherein the processing device is configured to execute a machine learning algorithm on the first signal propagation data and the second signal propagation data, the machine learning algorithm being configured to extract the localization data based on training data; and wherein the training data are obtained by at least one of an object position measurement system a predetermined test object arrangement within the indoor environment.

8. The system of claim 7, wherein the machine learning algorithm is configured to extract positions of static objects within the indoor environment.

9. The system of claim 1, wherein the extraction of localization data comprises an evaluation of time series and a spectral analysis to detect moving objects.

10. The system of claim 1,
wherein at least one of the first signal propagation data sensed by the wireless access points or the second signal propagation data sensed by the cooperative mobile network device is obtained from wireless signals reflected from a passive object, the passive object not sending any wireless signals, and
wherein the localization data is indicative of the position of the passive object.

11. The system of claim 1,
wherein at least one of the first signal propagation data sensed by the wireless access points or the second signal propagation data sensed by the cooperative mobile network device is obtained by at least one of the wireless access points or the cooperative mobile network device passively capturing wireless signals exchanged between a non-cooperative mobile network device and the wireless access point to which the non-cooperative mobile network device is connected; and
wherein the localization data is indicative of the position of the non-cooperative wireless network device.

12. The system of claim 1, wherein at least one of the first signal propagation data or the second signal propagation data is provided as raw data from a physical layer of the wireless communication infrastructure.

13. The system of claim 1, wherein the indoor environment is a passenger cabin of an aircraft.

14. An aircraft, comprising:
a passenger cabin; and
a system according to claim 1.

* * * * *